Sept. 9, 1952 N. J. NICOLETTI 2,609,944
APPARATUS FOR TRANSMITTING HOT PANS OF BREAD FROM OVENS
Filed Sept. 16, 1948 2 SHEETS—SHEET 1

INVENTOR.
N. J. NICOLETTI
BY Albert J. McCauley
ATTORNEY.

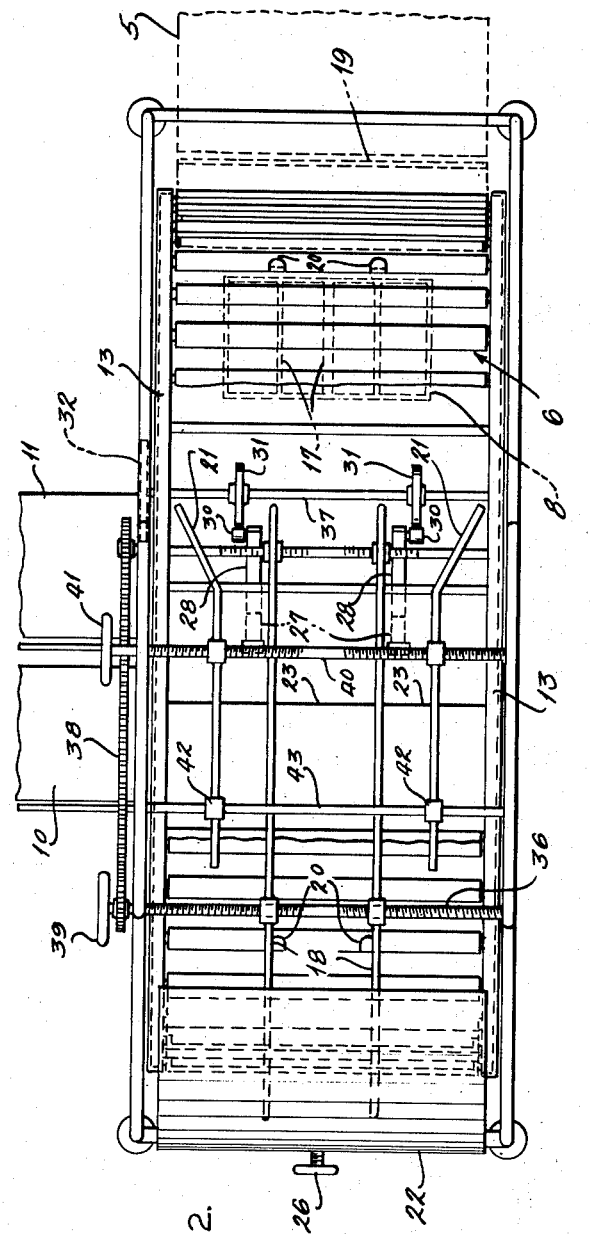

Patented Sept. 9, 1952

2,609,944

UNITED STATES PATENT OFFICE 2,609,944

APPARATUS FOR TRANSMITTING HOT PANS OF BREAD FROM OVENS

Nicholas J. Nicoletti, St. Louis, Mo.

Application September 16, 1948, Serial No. 49,518

6 Claims. (Cl. 214—1.1)

This invention relates to apparatus for transmitting hot pans of bread from ovens, and more particularly to the problem of economically separating the hot loaves from the pans.

In commercial practice very large ovens are employed to bake bread in pans seated on a traveling conveyor under conditions which provide for rather rapid discharge of the hot pans of baked bread. Each pan usually contains several loaves separated from each other by partitions which are exposed at the top of the pan. For example, the capacity of an oven may result in the discharge of about 16 pans per minute.

One of the objects of the present invention is to produce an efficient means for quickly loosening the hot loaves from the pans, and thereafter discharging the bread and pans in separate zones at a speed conforming approximately to the rate of discharge from the oven.

Another object is to avoid undue mutilation of the pans or the bread during these separating operations.

With the foregoing and other objects in view, the invention comprises the specific combination and arrangement of details hereinafter described. However, it is to be understood that the scope of the invention extends to modifications and variations more broadly set forth by terms employed in the claims hereunto appended.

Fig. 2 is a top view wherein a portion of the oven conveyor and its discharge chute are shown by dotted lines.

Fig. 3 is a detail view showing a suitable guide for an endless traveling carrier.

Fig. 4 is a section of the line 4—4 of Fig. 3, showing how a sprocket wheel can mesh with rollers of the traveling carrier.

Figure 1:
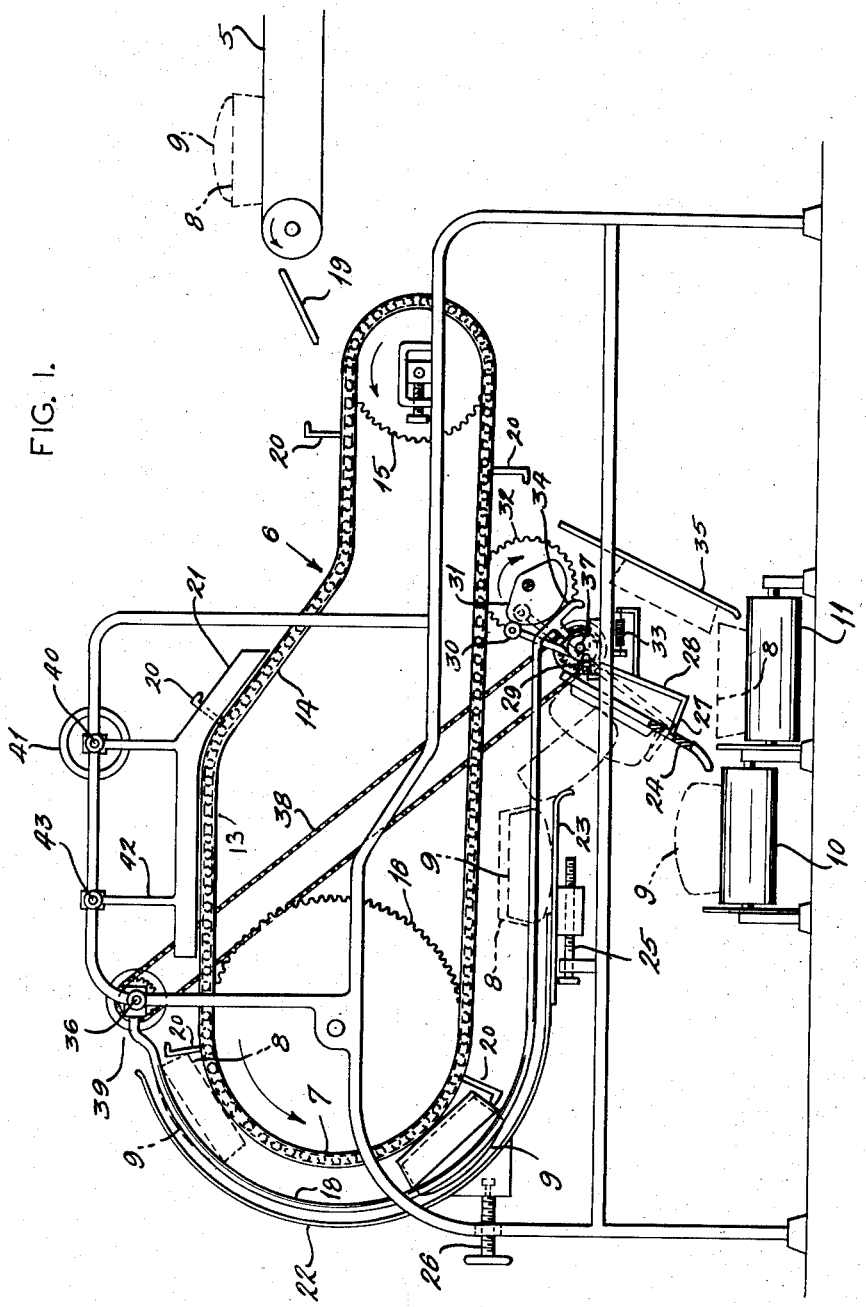
Fig. 1 is a side view, partly in section, of a machine embodying features of the invention.

Briefly stated the hot pans of bread are discharged from an oven conveyor 5 to a transferring device including an endless traveling carrier 6 provided with a return bend 7 at the left portion of Fig. 1 where the pans 8 are dumped and inverted while passing around the return bend, the loaves 9 being eventually delivered to a bread conveyor 10 while the pans are delivered to a pan conveyor 11, as will be hereafter described.

Each side of the traveling carrier 6 is provided with rollers 12 arranged in channel-shaped guides 13 as shown in Figures 3 and 4, said guides being inclined upwardly at 14 in Fig. 1 for a purpose which will be presently described. Sprocket wheels 15 and 16 are associated with the carrier 6 as shown in Fig. 1. Any suitable driving mechanism may be employed to drive these wheels at a speed conforming to the rate at which the hot pans of bread are discharged from the oven conveyor 5.

Each of the pans 8 has partitions 17 between loaves of bread, and these partitions are exposed at the tops of the pans as shown in Fig. 2 for contact with track devices 18 having curved portions near the return bend 7, said track devices being inclined downwardly around said return bend and extended under the return course of the traveling carrier to receive and support the inverted pans.

As shown in Fig. 1, the oven conveyor 5 may be provided with a chute 19 to discharge the hot pans of bread into a lower intake zone of the traveling carrier 6. The pans are then loosely supported by said carrier. However, this carrier preferably includes extended pushers 20 separated from each other and adapted to contact with the loose pans. When the carrier rises at the incline 14 (Fig. 1) a pan of loaves will contact with a lower pusher 20 for positive delivery to the track devices 18.

As a suitable means for alining the partitions 17 of the loose pans with said track devices 18, I have shown a pair of converging deflectors 21 located above the elevated path of the traveling carrier at opposite sides of the loose pans to deflect said pans to an approximately predetermined location wherein partitions 17 are suitably alined with the track devices 18.

As a consequence, when a pan is dumped at the return bend it will drop along the track devices 18 from a pusher 20 to forcibly contact with the next adjacent lower pusher, thereby loosening the loaves from the pans. At this time the free loaves tend to drop by gravity from the pans.

However, I have shown a bread retainer 22 separated from the track devices 18 to receive the forcibly loosened loaves of bread. This bread retainer 22 has a smooth supporting surface lower than but adjacent to said track devices, so as to temporarily retain the loosened loaves in pushing contact with the inverted pans driven by the pushers 20. The bread retainer also includes a smooth supporting member 23 adjustable to vary the location of its terminal margin at an entrance to a discharge chute 24 for the loaves of bread. As shown in Fig. 1, the supporting member 23 may be provided with an adjusting screw 25 for shifting said supporting member 23 toward and away from the chute 24.

The curved body portion of the bread retainer 22, which lies near the return bend of the carrier, is adjustable toward and away from curved portions of the track devices 18. As a suitable means for this adjustment, Fig. 1 shows a screw 26 passing through the frame of the machine and rotatably secured to the bread retainer 22.

The bread chute 24 is provided with a bread stop 27 movable into and out of the path of the falling loaves, said stop being carried by a lever 28 pivoted at 29 and provided with a roller 30 contacting with a rotary cam 31. This cam 31 is driven by a toothed wheel 32 meshing with rollers 12 of the carrier 6 as shown in Fig. 4 to move the bread stop 27 into and out of the path of the loaves. A spring 33 (Fig. 1) tends to retain the roller 30 in contact with the cam 31.

When the inverted pans are pushed along the lower portion of Fig. 1, the loosened loaves are tilted while dropping from the terminal margin of the adjustable supporting member 23, so as to occupy an approximately upright position in contact with the stop member 27. Thereafter, the stop member is withdrawn and the loaves fall to upright positions on the traveling bread conveyor 10.

However, the track devices 18 are extended beyond the outlet for the loaves of bread to a pan outlet where the pans are dropped from inclined end portions 34 of the tracks to a chute 35 leading to the traveling pan conveyor 11 where the pans are carried away in upright positions.

The hot loaves are separated from the pans without undue mutilation of the bread or pans, and these results are economically accomplished at a relatively high speed conforming to the rate of discharge from a large oven.

In commercial practice, the lengths of the pans 8 are variable and the same is true of the locations of the partitions 17 which contact with the track devices 18. To provide for such variations, the track devices 18 are adjustable toward and away from each other, and the converging deflectors 21 are likewise adjustable to locate the partitions 17 in approximate alinement with the tracks.

To illustrate a suitable condition of this kind, I have shown a screw threaded rod 36 at the upper ends of the track devices 18, said rod having right and left hand threads to adjust the track devices 18 toward and away from each other. The lower ends of said track devices may be supported by a similar rod 37 (Fig. 1).

In Figures 1 and 2 I have shown a sprocket device including a chain 38 to transmit rotary movement from the upper rod 36 to the lower rod 37. The upper rod 36 is provided with an operating wheel 39 to simultaneously adjust the upper and lower ends of the track devices 18.

The converging deflectors 21 are carried by a rod 40 having right and left hand screw threads to move said deflectors toward and away from each other. An operating wheel 41 is located at one end of said rod 40. As an additional support, said deflectors 21 may be provided with upward extensions 42 slidable on a plain rod 43.

I claim:

1. In an apparatus for transmitting hot pans of bread from an oven, an endless traveling carrier having an intake zone for the hot pans of bread and a return bend to dump the pans and their contents, traveling pushers movable with said carrier to contact with the pans, said pushers being separated from each other to advance the pans and provide abutments for the dumped pans, each dumped pan being dropped onto the next adjacent preceding pusher to forcibly loosen its bread from the pan, track devices associated with said return bend to receive and invert the dumped pans, said track devices being extended below the return course of said endless carrier to support the inverted pans in the path of said traveling pushers, a bread retainer having a relatively short supporting surface located below but adjacent to said track devices to temporarily confine the loosened bread in the inverted pans, an outlet for the bread being formed at the terminal margin of said relatively short supporting surface, and said track devices being provided with discharge ends beyond said bread outlet to separately discharge the pans.

2. In an apparatus for transmitting hot pans of bread from an oven having a conveyor to discharge said hot pans, a transferring device including an endless traveling carrier having an intake zone below the discharge end of said oven conveyor to loosely receive the hot pans of bread, said traveling carrier being provided with separated pushers to contact with the hot pans, a pair of converging deflectors located above said carrier at opposite sides of the path of the loose pans to deflect said pans to an approximately predetermined location on the carrier, track devices beyond said converging deflectors to contact with exposed top faces of the deflected pans, said endless traveling carrier being provided with a return bend to dump the hot pans of bread from said pushers, thereby inverting the traveling pans at said return bend while dropping each pan into forcible contact with the next adjacent preceding pusher to forcibly loosen the loaves in the pans, said track devices being inclined downwardly at said return bend and extended under the return course of said traveling carrier to receive and support the inverted pans in the path of said pushers, and a bread retainer separated from said track devices to receive the forcibly loosened loaves of bread, said bread retainer having a supporting surface lower than but adjacent to said track devices, so as to temporarily retain the loosened loaves in pushing contact with the inverted pans, an outlet for the loaves being formed at the terminal margin of said supporting surface, and said track devices being extended beyond the plane of said outlet for the loaves, so as to separately discharge the inverted pans.

3. In an apparatus for transmitting hot pans of bread from an oven having a conveyor to discharge said hot pans, a transferring device including an endless traveling carrier having an intake zone below the discharge end of said oven conveyor to loosely receive the hot pans of bread, said traveling carrier being provided with separated pushers to contact with the hot pans, means for guiding said traveling carrier in an upward direction from said intake zone to allow the loose pans to drop by gravity onto said pushers, a pair of converging deflectors located above the elevated path of said carrier at opposite sides of the path of the loose pans to deflect said pans to an approximately predetermined location on the carrier, track devices beyond said converging deflectors to contact with exposed top faces of the deflected pans, said endless traveling carrier being provided with a return bend to dump the hot pans of bread from said pushers, thereby inverting the traveling pans at said return bend while dropping each pan into forcible contact with the next adjacent preceding pusher to forcibly loosen the loaves in the pans, said track devices being inclined downwardly at said return bend and extended under the return course of said traveling carrier to receive and support the inverted pans in the path of said pushers, a bread retainer separated from said track devices to receive the forcibly loosened loaves of bread, said bread retainer having a supporting surface lower than but adjacent to said track devices, so as to temporarily retain the loosened loaves in pushing contact with the inverted pans, an outlet for the loaves being formed at the terminal margin of said supporting surface, a traveling bread conveyor below said outlet to receive the loaves of bread from the inverted pans, said track devices being extended beyond the plane of said outlet for the loaves, and a traveling pan conveyor beyond the extended portions of said track devices to receive the pans discharged therefrom.

4. In an apparatus for transmitting hot pans of bread from an oven under conditions wherein each pan has partitions between loaves of bread, an endless traveling carrier having an intake zone to receive the hot pans of bread, said traveling carrier being provided with a return bend to dump the pans of bread and loosen the hot loaves from the pans, track devices associated with said return bend to receive and invert the dumped pans, said track devices being adapted to contact with said partitions and extended below the return course said endless carrier to support the inverted pans, supports for said track devices including rotatable screws movable to adjust the track members toward and away from each other, pushers projecting from said carrier to push the inverted pans along said track devices, a bread retainer having a supporting surface located below but adjacent to said track devices so as to temporarily confine the loosened loaves in the inverted pans, an outlet for the loaves being formed at the terminal margin of said supporting surface, and said track devices being continued beyond said outlet to separately discharge the pans.

5. In an apparatus for transmitting hot pans of bread from an oven under conditions wherein each pan has partitions between loaves of bread, a transferring device including an endless traveling carrier having an intake zone to loosely receive the hot pans of bread, said traveling carrier being provided with separated pushers to contact with the hot pans, a pair of converging deflectors located above the path of said carrier at opposite sides of the path of the loose pans to deflect said pans to an approximately predetermined location on the carrier, track devices beyond said converging deflectors to contact with said partitions at exposed top faces of the deflected pans, means for adjusting said deflectors toward and away from each other to aline said partitions with the track devices, said endless traveling carrier being provided with a return bend to dump the hot pans of bread from said pushers, thereby inverting the traveling pans at said return bend while dropping each pan to forcibly loosen the loaves in the pans, said track devices being inclined downwardly at said return bend and extended under the return course of said traveling carrier to receive and support the inverted pans in the path of said pushers, a bread retainer separated from said track devices to receive the forcibly loosened loaves of bread, said bread retainer having a supporting surface lower than but adjacent to said track devices, so as to temporarily retain the loosened loaves in pushing contact with the inverted pans, and an outlet chute for the bread at the terminal margin of said supporting surface.

6. In an apparatus for transmitting hot pans of bread from an oven, an endless traveling carrier having a return bend to dump the pans and their contents, thereby loosening the bread in the pans, track devices associated with said return bend to receive and invert the dumped pans, said track devices being provided with extensions to support the inverted pans, and a bread retainer having a supporting surface located adjacent to said track devices to temporarily confine the loosened bread in the inverted pans, an outlet for the bread being formed at the terminal margin of said supporting surface, and said track devices being provided with discharge ends beyond said bread outlet to separately discharge the pans, said outlet for the bread comprising a chute to receive the loaves of bread, and a bread stop movable into and out of the path of the falling loaves, said loaves being tilted to approximately upright positions at the movable bread stop.

NICHOLAS J. NICOLETTI.

REFERENCES CITED

The following references are of record in the file of this patent:

UNITED STATES PATENTS

| Number | Name | Date |
| --- | --- | --- |
| 991,148 | Goldman | May 2, 1911 |
| 1,473,996 | McGarry | Nov. 3, 1923 |
| 1,561,664 | Rathwell | Nov. 17, 1925 |
| 1,843,995 | Thompson | Feb. 9, 1932 |
| 1,868,058 | Furness | July 19, 1932 |
| 1,945,758 | Turner | Feb. 6, 1934 |
| 2,032,946 | McHenry | Mar. 3, 1936 |
| 2,462,021 | Harker | Feb. 15, 1949 |